(12) United States Patent
Cheng et al.

(10) Patent No.: US 10,884,552 B2
(45) Date of Patent: Jan. 5, 2021

(54) TOUCH PANEL WITH SENSOR ELEMENTS

(71) Applicant: Au Optronics Corporation, Hsinchu (TW)

(72) Inventors: Mao-Hsun Cheng, Tainan (TW); Chia-Che Hung, Tainan (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/664,964

(22) Filed: Oct. 28, 2019

(65) Prior Publication Data

US 2020/0326793 A1    Oct. 15, 2020

(30) Foreign Application Priority Data

Apr. 15, 2019  (TW) .............................. 108113074 A

(51) Int. Cl.
| | |
|---|---|
| *G06F 3/042* | (2006.01) |
| *G06F 3/041* | (2006.01) |
| *G06F 3/044* | (2006.01) |
| *G02F 1/1335* | (2006.01) |

(52) U.S. Cl.
CPC ............ *G06F 3/042* (2013.01); *G02F 1/1335* (2013.01); *G02F 1/133512* (2013.01); *G06F 3/044* (2013.01); *G06F 3/0412* (2013.01); *G06F 3/04164* (2019.05); *G06F 2203/04106* (2013.01); *G06F 2203/04107* (2013.01)

(58) Field of Classification Search
CPC ........ G06F 3/042; G06F 3/0412; G06F 3/044; G06F 2203/04103; G06F 2203/04106; G06F 2203/04107; G02F 1/133512
See application file for complete search history.

(56) References Cited

U.S. PATENT DOCUMENTS

| | | |
|---|---|---|
| 8,502,902 B2 | 8/2013 | Kurokawa et al. |
| 9,746,979 B2 | 8/2017 | Yang |
| 10,031,622 B2 | 7/2018 | Kurokawa et al. |
| 2011/0221945 A1 | 9/2011 | Kurokawa et al. |
| 2013/0083258 A1* | 4/2013 | Kawasaki ......... G02F 1/136286 349/1 |
| 2013/0313412 A1 | 11/2013 | Kurokawa et al. |
| 2016/0224157 A1 | 8/2016 | Yang |
| 2017/0069667 A1* | 3/2017 | Chen ................ H01L 29/66757 |

FOREIGN PATENT DOCUMENTS

| | | |
|---|---|---|
| CN | 103345338 | 10/2013 |
| CN | 104091559 | 9/2016 |
| TW | I513302 | 12/2015 |

\* cited by examiner

*Primary Examiner* — Xuemei Zheng
(74) *Attorney, Agent, or Firm* — JCIPRNET

(57) ABSTRACT

A touch panel includes a substrate and a first sensor element disposed on the substrate. The first sensor element includes a light-shielding conductive layer, a first transparent conductive layer, a first photosensitive layer, and a first electrode electrically connected to the first photosensitive layer. The light-shielding conductive layer and the first transparent conductive layer are interposed between the first substrate and the first photosensitive layer. A transmittance of the light-shielding conductive layer is smaller than a transmittance of the first transparent conductive layer.

11 Claims, 4 Drawing Sheets

TOUCH PANEL WITH SENSOR ELEMENTS

CROSS-REFERENCE TO RELATED APPLICATION

This application claims the priority benefit of Taiwan application serial no. 108113074, filed on Apr. 15, 2019. The entirety of the above-mentioned patent application is hereby incorporated by reference herein and made a part of this specification.

BACKGROUND

Technical Field

The present disclosure relates to a touch panel, and more particularly to a touch panel having a sensor element having a light-shielding conductive layer.

Description of Related Art

Currently, the market tends to demand for more functionally integrated electronic devices, such as electronic devices that integrate multiple components together. In the existing electronic devices with touch and display devices, such as mobile phones, tablet computers, digital cameras, etc., the touch elements and the photosensitive elements are normally disposed in the display area and the non-display area, respectively. Therefore, the area required for component placement is increased, which causes that the display area of the touch display device cannot be further increased or the frame cannot be reduced.

In addition, conventionally, the photosensitive element disposed on the touch display device is susceptible to environmental influences and generates noise, resulting in poor quality of the output signal. Therefore, there is an urgent need for a method that can solve the aforementioned problems.

SUMMARY

The disclosure provides a touch panel with sensor elements integrated with self-capacitive touch and light sensing functions, which can reduce the size of the touch panel and improve the performance of the sensor element.

The touch panel of the present disclosure includes a substrate and the first sensor element disposed on the substrate. The first sensor element includes a light-shielding conductive layer, a first transparent conductive layer, a first photosensitive layer, and the first electrode electrically connected to the first photosensitive layer. The light-shielding conductive layer and the first transparent conductive layer are interposed between the substrate and the first photosensitive layer. The light transmittance of the light-shielding conductive layer is smaller than the light transmittance of the first transparent conductive layer.

Based on the above, the display panel of the embodiment of the present disclosure includes a first sensor element and a second sensor element that integrate self-capacitive touch and light sensing functions, thereby reducing the number of the touch element and the photosensitive element respectively, and further reducing the size of touch panel. In addition, the first sensor element can also be disposed in the display area together with the second sensor element. Therefore, the area required for the peripheral area can be further reduced, and the size of the touch panel can be decreased. Moreover, the light-shielding conductive layer included in the first sensor element has low light transmittance and can absorb ambient light, thereby ensuring that the outputted light sensing signal is not affected by the intensity of the ambient light, and can serve as a reference point. In this way, the second sensor element can improve the sensitivity and accuracy through the above reference point, thereby improving the performance of the touch panel. Furthermore, the first sensor element and the second sensor element can also be made of a common film layer. In this way, the manufacturing process of the touch panel can be simplified and the cost can be saved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
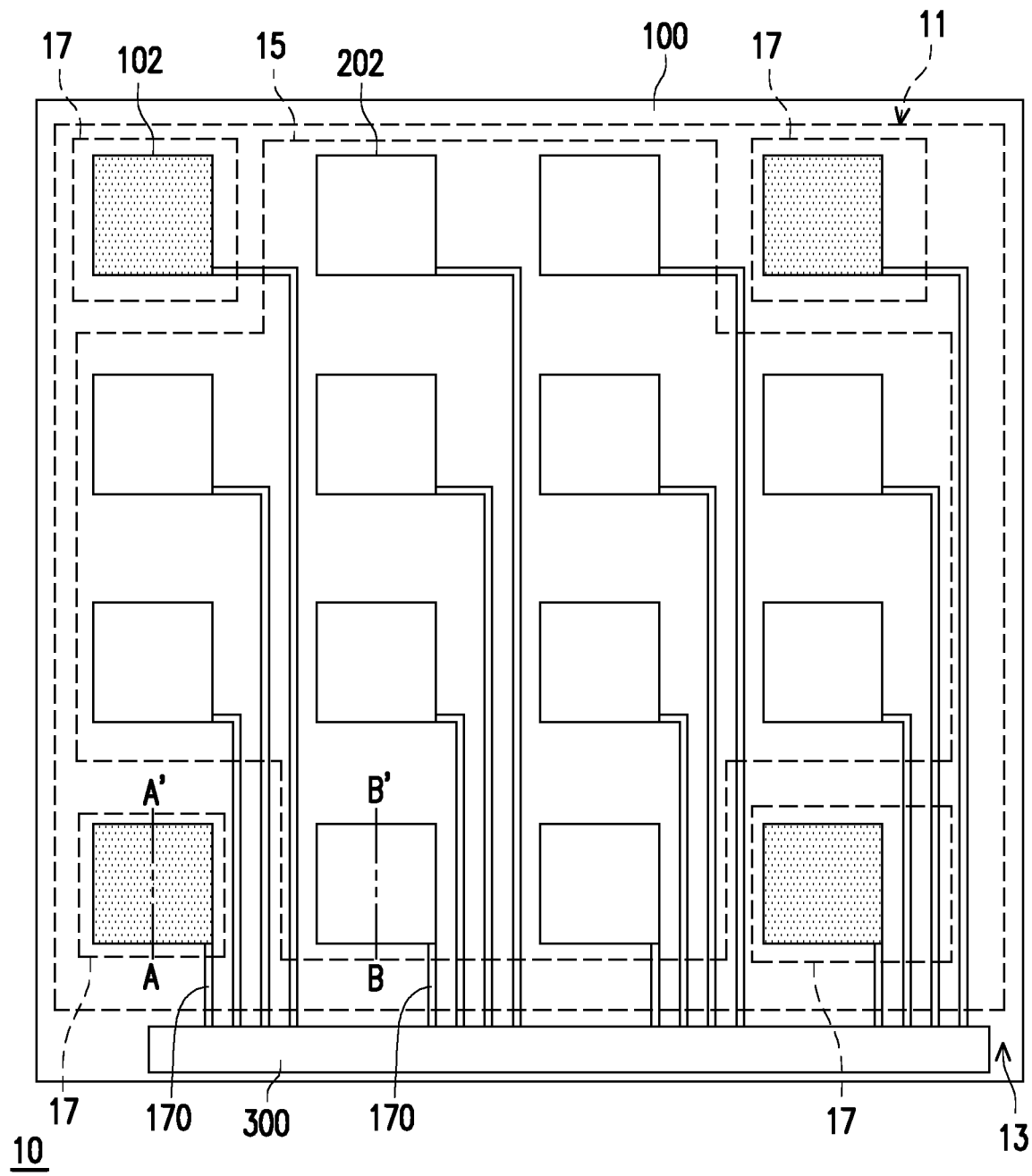
FIG. 1 is a schematic top view of a touch panel according to an embodiment of the disclosure.

Reference will now be made in detail to the present preferred embodiments of the disclosure, examples of which are illustrated in the accompanying drawings. It is to be understood that other embodiment may be utilized and structural changes may be made without departing from the scope of the present disclosure.

In the accompanying drawings, the thicknesses of layers, films, panels, regions, and the like are enlarged for clarity. Throughout the specification, same reference numerals indicate same components. It should be understood that when a component such as a layer, film, region or substrate is referred to as being "on", "connected" or "overlapped" to/with another component, it may be directly on or connected to the another component, or intervening components may also be present. In contrast, when a component is referred to as being "directly on" or "directly connected to" another component, there are no intervening assemblies present. As used herein, "connection" may refer to a physical and/or electrical connection.

It should be understood that although terms such as "first", "second", and "third" in this specification may be used for describing various elements, components, areas, layers, and/or parts, the elements, components, areas, layers, and/or parts are not limited by such terms. The terms are only used to distinguish one element, component, area, layer, or part from another element, component, area, layer, or part. Therefore, the "first element", "component, "area", "layer", or "part" described below may also be referred to as a second element, component, area, layer, or part without departing from the teachings of the present disclosure.

The term used herein is for the purpose of describing particular embodiments and is not particularly limited. The articles "a," "an," and "the" are intended to include the plural forms as well, meaning "at least one", unless the context clearly indicates otherwise. The articles "or" is intended to "and/or". As used herein, the term "and/or" includes any one and any combination of any two or more of the associated listed items. It is also to be understood that the terms "comprises" and/or "includes" specify the presence of stated features, regions, steps, operations, elements, components, and/or combinations thereof, but the existence or addition of one or more other features, regions, steps, operations, elements, components, and/or combinations thereof are not excluded.

Further, relative terms such as "lower" or "bottom" and "upper" or "top" may be used herein for ease of description to describe one element's relationship to another element as shown in the figures. It will be understood that relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. Similarly, if the device in the figures is turned over, an element described as being "below" or "lower" relative to another element will then be "above" or "upper" relative to the other element. Thus, the term "below" encompasses both the below and above orientations depending on the spatial orientation of the device.

The term "about," "approximately," "similar," or "substantially" as used herein is inclusive of the stated value and means within an acceptable range of deviation for the particular value as determined by people having ordinary skill in the art, considering the measurement in question and the error associated with measurement of the particular quantity (i.e., the limitations of the measurement system) or the limitations of the manufacturing system. For instance, "about" may mean within one or more standard deviations, or within, for example, ±30%, ±20%, ±10%, or ±5% of the stated value.

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

Exemplary embodiments of the invention are described with reference of schematic cross-sectional views of the idealized embodiments. Therefore, a shape variation of the drawings as a result of a manufacturing technique and/or manufacturing tolerance, for example, is expected. Therefore, the embodiments of the invention should not be interpreted as being limited to specific shapes of the regions shown in the drawings but may include a shape deviation caused during manufacture, for example. For example, a flat area shown in the figures or described herein may practically have rough and/or non-linear characteristics. Moreover, an acute angle shown in the drawings can practically be rounded. Therefore, the shapes shown in the figures are substantially schematic, and the shapes therein are not intended to represent accurate shapes, and are not intended to serve as limitations of the claims.

Figure 2:
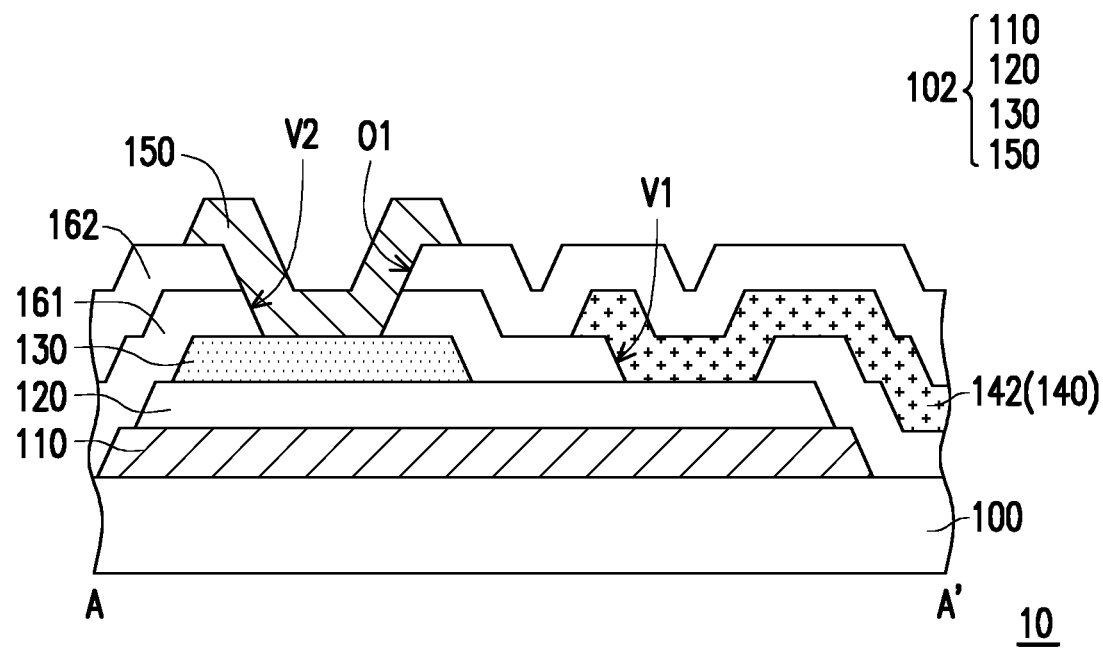
FIG. 2 is a schematic cross-sectional view of FIG. 1 taken along cross-sectional line A-A'.
Figure 3:
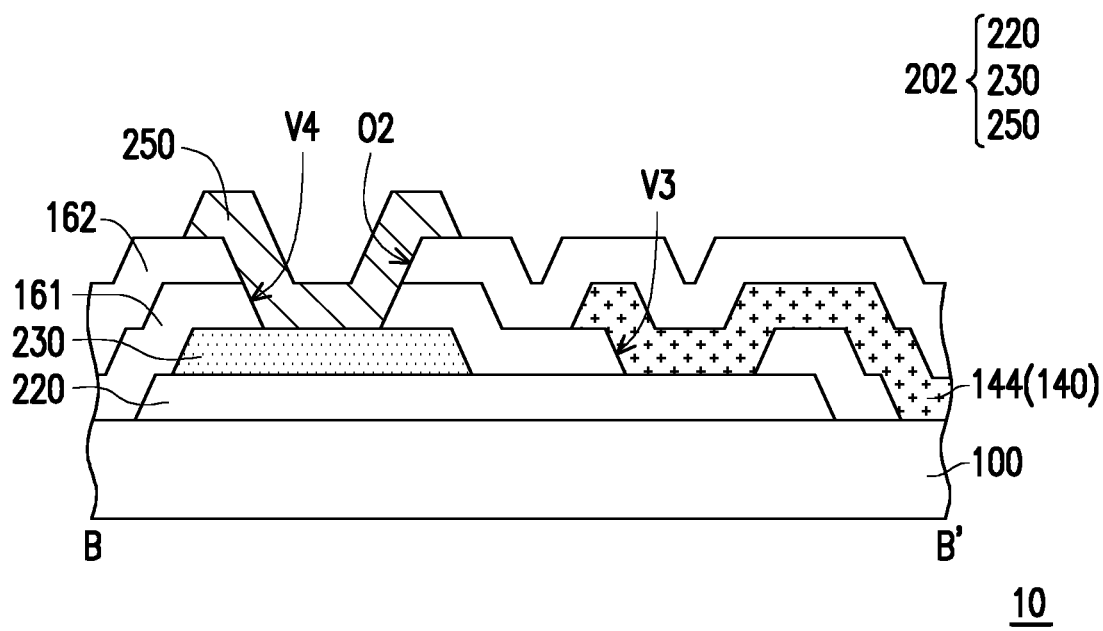
FIG. 3 is a schematic cross-sectional view of FIG. 1 taken along cross-sectional line B-B'.

FIG. 1 is a schematic top view of a touch panel according to an embodiment of the disclosure, and FIG. 1 is only schematically illustrated for convenience of description and observation. FIG. 2 is a schematic cross-sectional view of FIG. 1 taken along cross-sectional line A-A'. FIG. 3 is a schematic cross-sectional view of FIG. 1 taken along cross-sectional line B-B'. Referring to FIG. 1, FIG. 2 and FIG. 3, in the embodiment, a touch panel 10 includes a substrate 100, a plurality of first sensor elements 102 disposed on the substrate 100, a plurality of second sensor elements 202 disposed on the substrate 100, a driving circuit 300 disposed on the substrate 100 and a plurality of conductive electrodes 140 electrically connected to the first sensor element 102 or the second sensor element 202, respectively. The structure of the touch panel 10 will be briefly described below with an embodiment.

Referring to FIG. 1, the substrate 100 has a display area 11 and a peripheral area 13 surrounding the display area 11. A central area 15 and a plurality of corner areas 17 disposed outside the central area 15 may be defined in the display area 11. From another perspective, the corner areas 17 are defined, for example, as regions of the four corners of the display area 11, and the central area 15 is defined as a region outside the corner area 17 of the display area 11. In the embodiment, the number of the corner areas 17 corresponds to, for example, four corners of the display area 11, that is, the number of the corner areas 17 may be four, but the disclosure is not limited thereto. In some embodiments, the number of corner areas 17 may also be one, two, three or more depending on the needs of the user. In the embodiment, the material of the substrate 100 may be glass, quartz, organic polymer or other applicable materials, but the disclosure is not limited thereto.

In the embodiment, a plurality of sensor elements are disposed on the substrate 100. The sensor elements include a plurality of first sensor elements 102 and a plurality of second sensor elements 202. As shown in FIG. 1, the first sensor element 102 and the second sensor element 202 are disposed in arrays in the display area 11, but the disclosure is not limited thereto. In the embodiment, FIG. 1 only shows that the four first sensor elements 102 are respectively disposed at four corners of the display area 11, and the plurality of second sensor elements 202 are located at the center of the display area 11, but the number of the first sensor elements 102 and the second sensor elements 202 is not limited thereto. In some embodiments, the number of first sensor elements 102 may also be more or less than four. In addition, the number of the first sensor elements 102 may be less than or more than the number of the second sensor elements 202 according to the needs of the user, and the present disclosure is not limited thereto.

In detail, as shown in FIG. 1, the first sensor element 102 is disposed in the corner area 17, and the second sensor element 202 is disposed in the central area 15. In other words, the four first sensor elements 102 shown in FIG. 1 can be respectively disposed corresponding to the four corners of the display area 11 (for example, the upper left corner, the lower left corner, the upper right corner, and the lower right corner), but the present disclosure is not limited thereto. In other embodiments, the first sensor element 102 may also be disposed only in one of the corner areas 17. For example, only one of the first sensor elements 102 is disposed in the corner area 17 at the upper left corner of the display area 11, while the other first sensor elements 102 are disposed in the central area 15. In other embodiments, two or three or more first sensor elements 102 may also be correspondingly disposed in two or three or more different corner areas 17 according to the needs of the user. In some other embodiments, the plurality of first sensor elements 102 may also be disposed in the same corner area 17 according to the needs of the user, but the present disclosure is not limited thereto.

In addition, in the present embodiment, FIG. 1 only shows that the plurality of second sensor elements 202 are located in the central area 15, but the disclosure is not limited thereto. In some embodiments, the second sensor element 202 may also be located in the corner area 17 and/or the central area 15, respectively, depending on the needs of the user. In other words, those skilled in the art should understand that the number and arrangement relationship of the first sensor element 102 and the second sensor element 202 are not affected by the number and arrangement relationship shown in FIG. 1, but can be of any quantity and arrangement. First, it should be indicated that the first sensor element 102 and the second sensor element 202 are used as sensor elements of the touch panel 10, and the structure thereof will be described later.

Referring to FIG. 1, in the embodiment, the driving circuit 300 is disposed in the peripheral area 13 on the substrate 100. The driving circuit 300 includes, for example, a chip, a Micro Control Unit (MCU), or a Chip on Film (COF). Specifically, the driving circuit 300 of the embodiment may be, for example, a Touch with Display Driver Integration (TDDI) chip. In addition, as shown in FIG. 1, the first sensor element 102 and the second sensor element 202 are electrically connected to the driving circuit 300 through different wires 170 respectively. For example, the plurality of wires 170 may be disposed on the substrate 100 to electrically connect the first sensor element 102 and the second sensor element 202 to the driving circuit 300, respectively. Therefore, the wire 170 can output the sensing signal detected by the first sensor element 102 and the second sensor element 202 to the driving circuit 300, or input the driving signal of the driving circuit 300 to the first sensor element 102 and second sensor element 202. In the embodiment, the wire 170 is generally made of a metal material. However, the disclosure is not limited thereto. According to other embodiments, the wire 170 may also be formed of other conductive materials such as an alloy, an oxide of a metal material, a nitride of a metal material, an oxynitride of a metal material, or a stacked layer of a metal material and other conductive materials.

In the embodiment, the driving circuit 300 is disposed on the touch panel 10 as an example, but the disclosure is not limited thereto. In some embodiments, since the driving circuit 300 is a TDDI chip that can integrate the display signal and the touch signal, the driving circuit 300 can also be disposed on the display panel (not shown) opposite to the touch panel 10. In the above embodiment, the wire 170 can electrically connect the first sensor element 102 and the second sensor element 202 on the touch panel 10 to the driving circuit 300 on the display panel through a bridge structure (not shown) between the touch panel 10 and the display panel, but the disclosure is not limited thereto.

Please refer to FIG. 1 and FIG. 2, FIG. 2 is a schematic cross-sectional view of the first sensor element 102. In the embodiment, the first sensor element 102 include a light-shielding conductive layer 110, a first transparent conductive layer 120, a first photosensitive layer 130, and a first electrode 150. In detail, the light-shielding conductive layer 110 is disposed on the substrate 100. In the embodiment, the material of the light-shielding conductive layer 110 includes a metal or a metal alloy, such as molybdenum, aluminum, titanium, copper, gold, silver or other metal conductive materials or a stack of two or more kinds of the above materials or alloy of two or more materials, the disclosure is not limited thereto. In the embodiment, the light transmittance of the light-shielding conductive layer 110 is, for example, less than or equal to 0.1%. In other words, the optical density (OD) of the light-shielding conductive layer 110 is 3 or more. In the embodiment, the thickness of the light-shielding conductive layer 110 can be adjusted to achieve the range of the above-mentioned light transmittance. For example, in some embodiments, when the light-shielding conductive layer 110 is formed of silver, the thickness thereof is, for example, greater than or equal to 800 angstroms. In other embodiments, when the light-shielding conductive layer 110 is formed of aluminum, the thickness thereof is, for example, greater than or equal to 600 angstroms. However, the disclosure is not limited thereto.

As shown in FIG. 2, the first transparent conductive layer 120 is disposed on the light-shielding conductive layer 110. In the embodiment, the orthogonal projection of the first transparent conductive layer 120 on the substrate 100 overlaps and is located in the orthogonal projection of the light-shielding conductive layer 110 on the substrate 100, but the disclosure is not limited thereto. In some embodiments, the first transparent conductive layer 120 may also cover the light-shielding conductive layer 110 and be partially disposed on the substrate 100. In the embodiment, the material of the first transparent conductive layer 120 includes a transparent conductive ceramic material, for example, a ceramic material including a P-type or an N-type dopant. The ceramic material of the P-type dopant is, for example, copper boron oxide ($CuBO_2$), copper aluminum oxide ($CuAlO_2$), copper chromium oxide ($CuCrO_2$), copper gallium oxide ($CuGaO_2$), copper indium oxide ($CuInO_2$), strontium copper oxide ($SrCu_2O_2$) or other suitable ceramic materials, but the disclosure is not limited thereto. The ceramic material of the N-type dopant is, for example, indium tin oxide (ITO), indium zinc oxide (IZO), indium gallium zinc oxide (IGZO), indium gallium tin oxide (IGTO), aluminum zinc oxide (AZO), gallium zinc oxide (GZO), molybdenum zinc oxide (MZO), aluminum tin oxide (ATO) or other suitable ceramic materials, but the disclosure is not limited thereto. In the embodiment, the light transmittance of the first transparent conductive layer 120 is, for example, greater than or equal to 85%. In other words, the light transmittance of the light-shielding conductive layer 110 is smaller than the light transmittance of the first transparent conductive layer 120 compared to the first transparent conductive layer 120. In addition, the resistivity of the first transparent conductive layer 120 is $10^{-5}$ ohm-cm to $10^{-3}$ ohm-cm, but the disclosure is not limited thereto.

In the embodiment, the first photosensitive layer 130 is disposed on the first transparent conductive layer 120. The orthogonal projection of the first photosensitive layer 130 on the substrate 100 overlaps and is located in the orthogonal projection of the first transparent conductive layer 120 on the substrate 100, but the disclosure is not limited thereto. In the embodiment, the material of the first photosensitive layer 130 includes a photosensitive material, such as Silicon Rich Oxide (SRO), amorphous silicon (a-Si), or a combination thereof, but the present disclosure is not limited thereto. Any material that can generate photocurrent after illumination can be used as the material of the first photosensitive layer 130.

Figure 6:
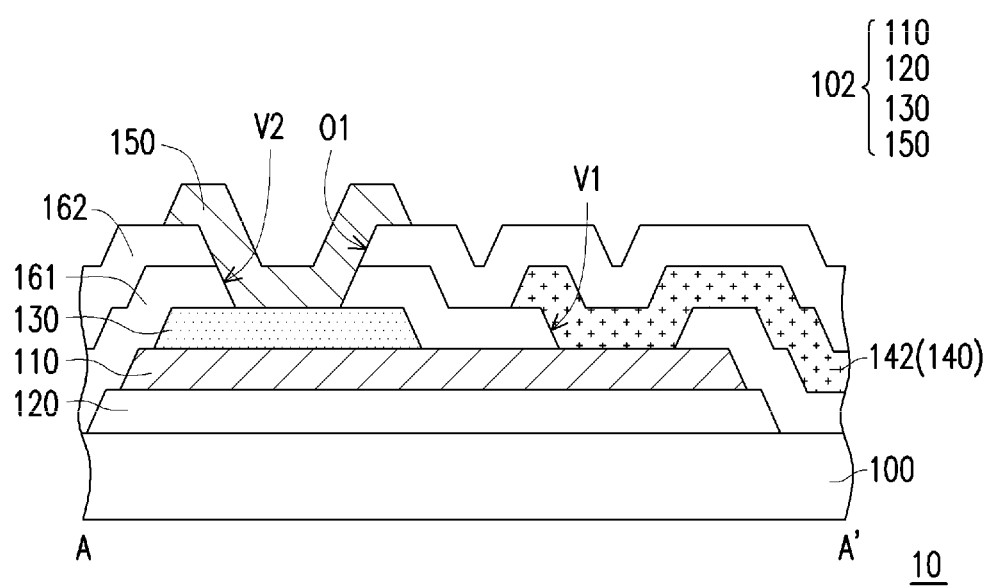
FIG. 6 is a schematic cross-sectional view of a first sensor element of a touch panel according to still another embodiment of the present disclosure.

As shown in FIG. 2, the light-shielding conductive layer 110 and the first transparent conductive layer 120 are interposed between the substrate 100 and the first photosensitive layer 130. More specifically, the first transparent conductive layer 120 is interposed between the light-shielding conductive layer 110 and the first photosensitive layer 130, but the disclosure is not limited thereto. In some embodiments, the first transparent conductive layer 120 may also be disposed on the substrate 100, and the light-shielding conductive layer 110 is disposed on the first transparent conductive layer 120, and the first photosensitive layer 130 is disposed on the light-shielding conductive layer 110. In other words, in the above embodiment, the light-shielding conductive layer 110 is interposed between the first transparent conductive layer 120 and the first photosensitive layer 130, as shown in FIG. 6.

In the embodiment, the first insulating layer 161 is disposed on the substrate 100 and covers the light-shielding conductive layer 110, the first transparent conductive layer 120, and the first photosensitive layer 130. As shown in FIG. 2, the first insulating layer 161 may have a first contact via V1, and the orthogonal projection of the first contact via V1 on the substrate 100 may overlap the orthogonal projection of the first transparent conductive layer 120 on the substrate 100. In addition, the first insulating layer 161 further has a second contact via V2, and the orthogonal projection of the second contact via V2 on the substrate 100 may overlap the orthogonal projection of the first photosensitive layer 130 on the substrate 100. Therefore, the first insulating layer 161 may expose the first transparent conductive layer 120 through the first contact via V1, and expose the first photosensitive layer 130 through the second contact via V2. In the embodiment, the material of the first insulating layer 161 includes, for example, an inorganic insulating material or an organic insulating material. The inorganic insulating materials include: silicon nitride ($SiN_x$), silicon oxide ($SiO_x$), silicon oxynitride ($SiO_xN_y$) or other suitable insulating materials. The organic insulating material includes: polyimide (PI), polyacrylic acid (PAA), polyamine (PA), polyvinyl alcohol (PVA), polyvinyl chloride (PVC) or other suitable insulating materials, but the present disclosure is not limited thereto.

In the embodiment, the conductive electrode 140 can be disposed on the first insulating layer 161 and electrically connected to the first sensor element 102 through the first contact via V1. Specifically, the conductive electrode 140 is, for example, plural, including the first conductive electrode 142. The first conductive electrode 142 is electrically connected to the first transparent conductive layer 120 of the first sensor element 102 through the first contact via V1. In the embodiment, the material of the conductive electrode 140 (including the first conductive electrode 142) includes a metal conductive material, but the disclosure is not limited thereto. For example, the conductive electrode 140 may be a molybdenum metal or a titanium/aluminum/titanium metal laminate, but the disclosure is not limited thereto.

In the embodiment, the first conductive electrode 142 can electrically connect the first transparent conductive layer 120 of the first sensor element 102 to the driving circuit 300. Specifically, referring to FIG. 1 and FIG. 2, the wire 170 can be electrically connected to the first sensor element 102 through the first conductive electrode 142. Therefore, the first sensor element 102 can be electrically connected to the driving circuit 300 through the first conductive electrode 142 and the wire 170.

In the embodiment, the second insulating layer 162 is disposed on the first insulating layer 161 and covers the first conductive electrode 142. As shown in FIG. 2, the second insulating layer 162 may have a first opening O1, and the orthogonal projection of the first opening O1 on the substrate 100 may overlap the orthogonal projection of the second contact via V2 on the substrate 100. In other words, the first photosensitive layer 130 can be exposed by the first opening O1 and the second contact via V2. In the embodiment, the material of the second insulating layer 162 includes, for example, an inorganic insulating material or an organic insulating material. The inorganic insulating materials include: silicon nitride ($SiN_x$), silicon oxide ($SiO_x$), silicon oxynitride ($SiO_xN_y$) or other suitable insulating materials. The organic insulating material includes: polyimide (PI), polyacrylic acid (PAA), polyamine (PA), polyvinyl alcohol (PVA), polyvinyl chloride (PVC) or other suitable insulating materials, but the present disclosure is not limited thereto.

In the embodiment, the first electrode 150 is disposed on the second insulating layer 162 and electrically connected to the first photosensitive layer 130 through the first opening O1 and the second contact via V2. In this manner, the configuration of the first sensor element 102 has been completed. In the embodiment, the material of the first electrode 150 includes a metal conductive material, but the disclosure is not limited thereto. For example, the first electrode 150 may be a molybdenum metal or a titanium/aluminum/titanium metal laminate, but the disclosure is not limited thereto. In the embodiment, the first electrode 150 can electrically connect the first photosensitive layer 130 of the first sensor element 102 to the driving circuit 300. In this way, the driving circuit 300 can supply a reference voltage (e.g., bias) to the first sensor element 102 through the first electrode 150 to improve the sensitivity and accuracy of the first sensor element 102, thereby enhancing the performance of the first sensor element 102.

Please refer to FIG. 1 and FIG. 3. FIG. 3 is a schematic cross-sectional view of the second sensor element 202. In the present embodiment, the structure of the second sensor element 202 is similar to that of the first sensor element 102, and the main difference is that the second sensor element 202 does not include the light-shielding conductive layer 110 (shown in FIG. 2). Specifically, the second sensor element 202 includes a second transparent conductive layer 220, a second photosensitive layer 230, and a second electrode 250. As shown in FIG. 2, the second transparent conductive layer 220 is disposed on the substrate 100. In the embodiment, the material of the second transparent conductive layer 220 is similar to that of the first transparent conductive layer 120, including a transparent conductive ceramic material, and therefore will not be described again. In the embodiment, the light transmittance of the second transparent conductive layer 220 is, for example, greater than or equal to 85%, but the disclosure is not limited thereto. In addition, the second transparent conductive layer 220 has a resistivity of $10^{-5}$ ohm-cm to $10^{-3}$ ohm-cm, but the disclosure is not limited thereto.

In the embodiment, the second photosensitive layer 230 is disposed on the second transparent conductive layer 220. As shown in FIG. 3, the orthogonal projection of the second photosensitive layer 230 on the substrate 100 overlaps and is located in the orthogonal projection of the second transparent conductive layer 220 on the substrate 100, but the disclosure is not limited thereto. In another aspect, the second transparent conductive layer 220 is interposed between the substrate 100 and the second photosensitive layer 230. In the embodiment, the material of the second photosensitive layer 230 is similar to that of the first photosensitive layer 130, and includes a photosensitive material, and thus no further descriptions are incorporated herein. Any material that can generate photocurrent after illumination can be used as the material of the second photosensitive material 230.

In the embodiment, the first insulating layer 161 is disposed on the substrate 100 and covers the second transparent conductive layer 220 and the second photosensitive layer 230. As shown in FIG. 3, the first insulating layer 161 may have a third contact via V3, and the orthogonal projection of the third contact via V3 on the substrate 100 may overlap the orthogonal projection of the second transparent conductive layer 220 on the substrate 100. In addition, the first insulating layer 161 further has a fourth contact via V4, and the orthogonal projection of the fourth contact via V4 on the substrate 100 may overlap the orthogonal projection of the second photosensitive layer 230 on the substrate 100. Therefore, the first insulating layer 161 may expose the second transparent conductive layer 220 through the third contact via V3, and expose the second photosensitive layer 230 through the fourth contact via V4.

In the embodiment, the conductive electrode 140 can also be disposed on the first insulating layer 161 and electrically connected to the second sensor element 202 through the third contact via V3. Specifically, the plurality of conductive electrodes 140 include a second conductive electrode 144 in addition to the first conductive electrode 142. The second conductive electrode 144 is electrically connected to the second transparent conductive layer 220 of the second sensor element 202 through the third contact via V3. In the embodiment, the materials of the second conductive electrode 144 and the first conductive electrode 142 and/or the conductive electrode 140 may be the same, so the details are not described herein. For example, the second conductive electrode 144 may be a molybdenum metal or a titanium/aluminum/titanium metal laminate, but the disclosure is not limited thereto.

In the embodiment, the second conductive electrode 144 can electrically connect the second transparent conductive layer 220 of the second sensor element 202 to the driving circuit 300. Specifically, referring to FIG. 1 and FIG. 3, the wire 170 can be electrically connected to the second sensor element 202 through the second conductive electrode 144. Therefore, the second sensor element 202 can be electrically connected to the driving circuit 300 through the second conductive electrode 144 and the wire 170.

In the embodiment, the second insulating layer 162 is disposed on the first insulating layer 161 and covers the second conductive electrode 144. As shown in FIG. 3, the second insulating layer 162 may have a second opening O2, and the orthogonal projection of the second opening O2 on the substrate 100 may overlap the orthogonal projection of the fourth contact via V4 on the substrate 100. In other words, the second photosensitive layer 230 can be exposed by the second opening O2 and the fourth contact via V4.

In the embodiment, the second electrode 250 is disposed on the second insulating layer 162 and electrically connected to the second photosensitive layer 230 through the second opening O2 and the fourth contact via V4. In this manner, the configuration of the second sensor element 202 has been completed. In the embodiment, the material of the second electrode 250 is similar to the first electrode 150, and includes a metal conductive material, so the details are not described herein. For example, the second electrode 250 may also be a molybdenum metal or a titanium/aluminum/titanium metal laminate, but the disclosure is not limited thereto. In the embodiment, the second electrode 250 can electrically connect the second photosensitive layer 230 of the second sensor element 202 to the driving circuit 300. In this way, the driving circuit 300 can supply a reference voltage (e.g., bias) to the second sensor element 202 through the second electrode 250 to improve the sensitivity and accuracy of the second sensor element 202, thereby enhancing the performance of the second sensor element 202.

It should be noted that the first sensor element 102 and the second sensor element 202 are, for example, sensor elements that integrate self-capacitive touch and light sensing functions. For example, as shown in FIG. 1 and FIG. 2, when the user's finger (not shown) contacts the substrate 100 and overlaps the light-shielding conductive layer 110, the substrate 100 located between the finger and the light-shielding conductive layer 110 can generate the touch capacitance signal (not shown). In the above configuration, the touch capacitance signal can be transmitted to the first conductive electrode 142 through the light-shielding conductive layer 110 and the first transparent conductive layer 120, and then outputted to the driving circuit 300 through the wire 170 electrically connected to the first conductive electrode 142. In this manner, the driving circuit 300 can obtain the touch capacitance signal detected by the first sensor element 102.

Similarly, as shown in FIG. 1 and FIG. 3, when the user's finger (not shown) contacts the substrate 100 and overlaps the second transparent conductive layer 220, the substrate 100 disposed between the finger and the second transparent conductive layer 220 can generate touch capacitance signal (not shown). In the above configuration, the touch capacitance signal can be transmitted to the second conductive electrode 144 through the second transparent conductive layer 220, and then outputted to the driving circuit 300 through the wire 170 electrically connected to the second conductive electrode 144. In this manner, the driving circuit 300 can obtain the touch capacitance signal detected by the second sensor element 202. In other words, the first sensor element 102 and the second sensor element 202 are both self-capacitive touch sensor elements.

In addition, the first sensor element 102 and the second sensor element 202 further include a first photosensitive layer 130 and a second photosensitive layer 230 as photosensitive elements, respectively. In detail, referring to FIG. 1 and FIG. 3, when ambient light is present, the ambient light may pass through the substrate 100 and the second transparent conductive layer 220 to illuminate the second photosensitive layer 230. Under the above configuration, the second photosensitive layer 230 can generate photocurrent through illumination. In this manner, the generated photocurrent may flow to the second conductive electrode 144 through the second transparent conductive layer 220, and then outputted to the driving circuit 300 through the second conductive electrode 144, so that the driving circuit 300 can obtain the photocurrent (for example, as a light sensing signal) generated by the sensor element 202 and convert the same into a corresponding voltage change amount. In addition, the above photocurrent is proportional to the intensity of ambient light. That is, the photocurrent generated by strong ambient light to the second sensor element 202 may be greater than the photocurrent generated by the weak ambient light to the second sensor element 202. From another perspective, the second sensor element 202 can generate a strong light sensing signal to the driving circuit 300 under strong ambient light illumination with respect to weak ambient light. Therefore, the second sensor element 202 can be used as a sensor element integrating self-capacitive touch and light sensing functions. As such, the second sensor element 202 can reduce the size of the touch panel 10.

It should be noted that the first sensor element 102 also has a first photosensitive layer 130 with a light sensing function, and thus can also be used as a sensor element integrated with self-capacitive touch and light sensing functions to obtain the technical effect similar to that of the second sensor element 202. However, as shown in FIG. 2, the light-shielding conductive layer 110 included in the first sensor element 102 is located between the first photosensitive layer 130 and the substrate 100, and the light transmittance of the light-shielding conductive layer 110 is smaller than the light transmittance of the first transparent conductive layer 120. That is to say, the ambient light can be absorbed by the light-shielding conductive layer 110 after passing through the substrate 100. In this manner, the first sensor element 102 can stably use a fixed photocurrent as a comparison reference. In other words, the light sensing signal outputted by the first sensor element 102 is not affected by the intensity of the ambient light, but can be used as a reference point. In this way, the light sensing signal outputted by the second sensor element 202 can be compared through the reference point established by the first sensor element 102, thereby reducing the influence of ambient noise on the second sensor element 202, and improving the sensitivity and accuracy of the second sensor element 202, thereby improving the performance of the touch panel 10.

In addition, in the manufacturing process, since the first sensor element 102 and the second sensor element 202 only differ in that the first sensor element 102 includes the light-shielding conductive layer 110, the first sensor element 102 and the second sensor element 202 can be simultaneously disposed in the display area 11 on the substrate 100 through the same mask and steps. For example, in the above configuration, the first transparent conductive layer 120 and the second transparent conductive layer 220 may belong to the same film layer and be formed simultaneously. The first photosensitive layer 130 and the second photosensitive layer 230 may belong to the same film layer and be formed simultaneously. The first electrode 150 and the second electrode 250 may also belong to the same film layer and be formed simultaneously, which simplifies the manufacturing process and saves costs.

In addition, the first sensor element 102 providing the reference point may be disposed in the display area 11 together with the second sensor element 202. Therefore, the area required for the peripheral area 13 can be further reduced, and the size of the touch panel 10 can be decreased.

In short, the touch panel 10 of the present embodiment includes the first sensor element 102 and the second sensor element 202 that integrate self-capacitive touch and light sensing functions, thereby reducing the number of the touch element and the photosensitive element disposed separately, thereby decreasing the size of the touch panel 10. Moreover, the first sensor element 102 can also be disposed in the display area 11 together with the second sensor element 202. Therefore, the area required for the peripheral area 13 can be further reduced, and the size of the touch panel 10 can be decreased. Furthermore, the light-shielding conductive layer 110 included in the first sensor element 102 has low light transmittance and can absorb ambient light, thereby ensuring that the outputted light-sensing signal is not affected by the intensity of the ambient light, and can be used as a reference point. In this way, through the reference point established by the first sensor element 102, the influence of the ambient noise on the second sensor element 202 can be reduced, thereby improving the sensitivity and accuracy of the second sensor element 202, and further enhancing the performance of the touch panel 10.

In addition, the first sensor element 102 and the second sensor element 202 can be made of a common film layer. Therefore, the manufacturing process of the touch panel 10 can be simplified, and cost can be saved.

In the embodiment, the touch panel 10 further includes an array substrate (not shown) disposed on the opposite side of the touch panel 10 to form a touch display panel (not shown) in pairs. In the above embodiment, the first sensor element 102 and the second sensor element 202 are located between the touch panel 10 and the array substrate. The touch display panel is, for example, a liquid crystal display panel (LCD panel) having a touch and light sensing function, a light-emitting diode panel (LED panel), or an organic light-emitting diode panel (OLED panel) or other suitable display panel. In this way, the touch display panel can have good performance as well as light and slim size.

The following embodiments use the same reference numerals and parts of the descriptions in the foregoing embodiments, wherein the same reference numerals are used to refer to the same or similar elements, and the same part of descriptions that is omitted may be derived from the foregoing embodiments, and is not repeated in the following embodiment.

Figure 4:
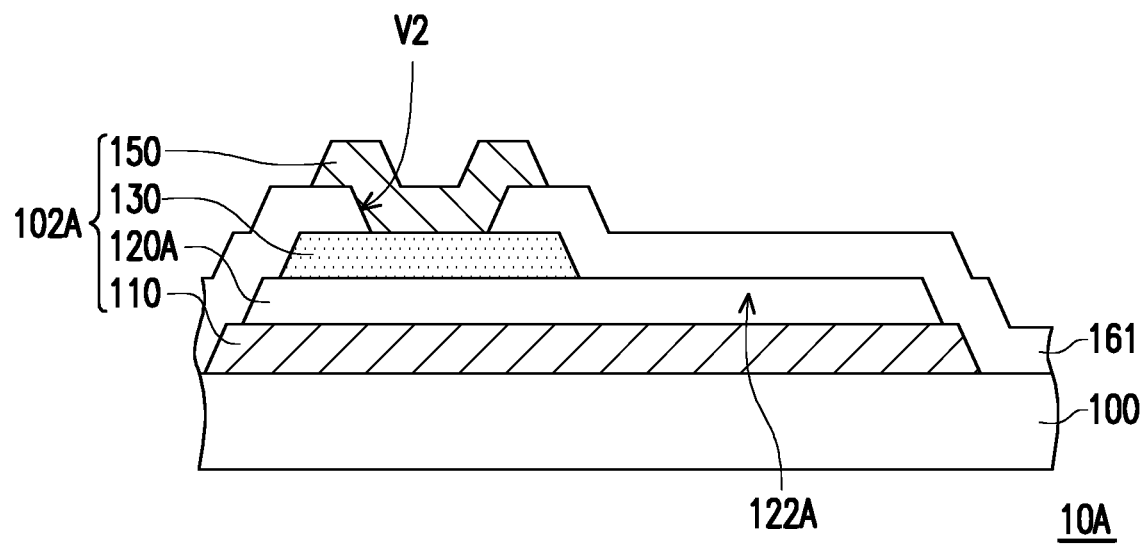
FIG. 4 is a schematic cross-sectional view of a first sensor element of a touch panel according to another embodiment of the disclosure.

FIG. 4 is a schematic cross-sectional view of a first sensor element of a touch panel according to another embodiment of the disclosure. Referring to FIG. 2 and FIG. 4, a first sensor element 102A of a touch panel 10A of the present embodiment is similar to the first sensor element 102 of FIG. 2. The main difference is that the first sensor element 102A is not electrically connected to the conductive electrode 140 (e.g., the first conductive electrode 142). In the embodiment, the first transparent conductive layer 120A can define a first wire portion 122A to be electrically connected to the wire 170 (shown in FIG. 1) and then electrically connected to the driving circuit 300 through the wire 170 (shown in FIG. 1). In some embodiments, when the first wire portion 122A is defined by the first transparent conductive layer 120A, the first wire portion 122A may be disposed as the wire 170 and directly electrically connected to the driving circuit 300. This is because the film resistivity of the first transparent conductive layer 120A can be sufficiently low, for example, $10^{-5}$ ohm-cm to $10^{-3}$ ohm-cm, so that the first wire portion 122A which replaces the first conductive electrode 142 and/or the wire 170 can be directly defined by the first transparent conductive layer 120A. In this way, the manufacturing process can be further simplified, the time for forming the opening or the contact via can be saved, and the manufacturing cost can be saved. Moreover, the touch panel 10A and the first sensor element 102A can also achieve similar technical effects as the above embodiments.

Figure 5:
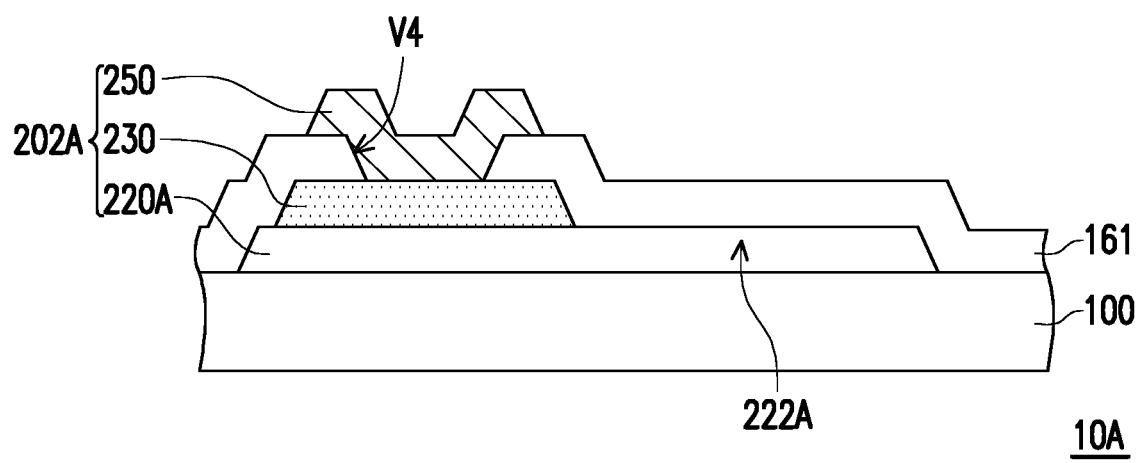
FIG. 5 is a schematic cross-sectional view of a second sensor element of a touch panel according to still another embodiment of the present disclosure.

FIG. 5 is a schematic cross-sectional view of a second sensor element of a touch panel according to another embodiment of the present disclosure. Referring to FIG. 3 and FIG. 5, a second sensor element 202A of the touch panel 10A of the present embodiment is similar to the second sensor element 202 of FIG. 3. The main difference is that the second sensor element 202A is not electrically connected to the conductive electrode 140 (e.g., the second conductive electrode 144). In the embodiment, the second transparent conductive layer 220A can define a second wire portion 222A to be electrically connected to the wire 170 (shown in FIG. 1), and then electrically connected to the driving circuit 300 through the wire 170 (shown in FIG. 1). In some embodiments, when the second wire portion 222A is defined by the second transparent conductive layer 220A, the second wire portion 222A may be disposed as the wire 170 and directly electrically connected to the driving circuit 300. This is because the film resistivity of the second transparent conductive layer 220A can be sufficiently low, for example, $10^{-5}$ ohm-cm to $10^{-3}$ ohm-cm, so that the second wire portion 222A which replaces the second conductive electrode 144 and/or the wire 170 can be directly defined by the second transparent conductive layer 220A. In this way, the manufacturing process can be further simplified, the time for forming the opening or the contact via can be saved, and the manufacturing cost can be saved. Moreover, the touch panel 10A and the second sensor element 202A can also achieve similar technical effects as the above embodiments.

In summary, the touch panel of an embodiment of the present disclosure includes a first sensor element and a second sensor element that integrate self-capacitive touch and light sensing functions, thereby reducing the number of the touch element and the photosensitive element disposed separately, and decreasing the size of the touch panel. Moreover, the first sensor element can also be disposed in the display area together with the second sensor element. Therefore, the area required for the peripheral area can be further reduced, and the size of the touch panel can be decreased. Furthermore, the light-shielding conductive layer included in the first sensor element has low light transmittance and can absorb ambient light, thereby ensuring that the outputted light sensing signal is not affected by the intensity of the ambient light, and can be used as a reference point. In this way, through the reference point established by the first sensor element, the influence of the ambient noise on the second sensor element can be reduced, thereby improving the sensitivity and accuracy of the second sensor element, and enhancing the performance of the touch panel.

Moreover, the first sensor element and the second sensor element can be made of a common film layer. Therefore, the manufacturing process of the touch panel can be simplified and the cost can be saved. Additionally, the first sensor element and the second sensor element of the touch panel may directly define the first wire portion and the second wire portion to replace the conductive electrode and the wire through the first transparent conductive layer and the second transparent conductive layer, respectively. In this way, the manufacturing process can be further simplified, the time for forming the opening or the contact via can be saved, and the manufacturing cost can be saved.

Furthermore, the touch panel can also be paired with the array substrate to form a touch display panel. Therefore, the touch display panel can include sensor elements with good performance and integrated with self-capacitive touch and light sensing functions while having a slim and light size.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch panel, comprising:
   a substrate;
   a first sensor element disposed on the substrate and comprising:
   a light-shielding conductive layer;
   a first transparent conductive layer;
   a first photosensitive layer, and the light-shielding conductive layer and the first transparent conductive layer interposed between the substrate and the first photosensitive layer; and
   a first electrode electrically connected to the first photosensitive layer,
   wherein a light transmittance of the light-shielding conductive layer is smaller than a light transmittance of the first transparent conductive layer; and
   a second sensor element disposed on the substrate and comprising a second photosensitive layer, wherein the second sensor element does not contain a light-shielding conductive layer interposed between the substrate and the second photosensitive layer.

2. The touch panel of claim 1, the second sensor element further comprising:
   a second transparent conductive layer interposed between the substrate and the second photosensitive layer; and
   a second electrode electrically connected to the second photosensitive layer.

3. The touch panel of claim 2, wherein the substrate has a display area and a peripheral area surrounding the display area, and a central area and a plurality of corner areas outside the central area are defined in the display area, wherein the first sensor element and the second sensor element are located in the display area.

4. The touch panel of claim 3, wherein the first sensor element is located in one of the corner areas, and the second sensor element is located in the central area.

5. The touch panel of claim 3, further comprising:
   a driving circuit disposed in the peripheral area on the substrate; and
   a plurality of conductive electrodes electrically connected to the first sensor element or the second sensor element, respectively,
   wherein one of the conductive electrodes electrically connects the first transparent conductive layer to the driving circuit, and the other of the conductive electrodes electrically connects the second transparent conductive layer to the driving circuit.

6. The touch panel according to claim 3, further comprising:
   a driving circuit disposed in the peripheral area on the substrate,
   wherein the first transparent conductive layer defines a first wire portion and is electrically connected to the driving circuit, and the second transparent conductive layer defines a second wire portion and is electrically connected to the driving circuit.

7. The touch panel of claim 1, wherein the first transparent conductive layer is interposed between the light-shielding conductive layer and the first photosensitive layer.

8. The touch panel of claim 1, wherein the light-shielding conductive layer is interposed between the first transparent conductive layer and the first photosensitive layer.

9. The touch panel of claim 1, wherein the light-shielding conductive layer has a light transmittance of less than or equal to 0.1%, and the first transparent conductive layer has a light transmittance of greater than or equal to 85%.

10. The touch panel of claim 1, wherein the first transparent conductive layer has a resistivity of $10^{-5}$ ohm-cm to $10^{-3}$ ohm-cm.

11. The touch panel of claim 1, wherein the material of the light-shielding conductive layer is a metal or a metal alloy.

* * * * *